(12) United States Patent
Long et al.

(10) Patent No.: US 8,913,805 B2
(45) Date of Patent: Dec. 16, 2014

(54) THREE-DIMENSIONAL FORWARD AND BACK PROJECTION METHODS

(75) Inventors: Yong Long, Ann Arbor, MI (US);
Jeffrey A. Fessler, Ann Arbor, MI (US);
James M. Balter, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 261 days.

(21) Appl. No.: 13/219,997

(22) Filed: Aug. 29, 2011

(65) Prior Publication Data

US 2012/0051626 A1 Mar. 1, 2012

Related U.S. Application Data

(60) Provisional application No. 61/378,041, filed on Aug. 30, 2010.

(51) Int. Cl.
*G06K 9/00* (2006.01)
*G06K 9/40* (2006.01)
*G06T 11/00* (2006.01)
*G06T 15/08* (2011.01)

(52) U.S. Cl.
CPC .............. *G06T 11/006* (2013.01); *G06T 15/08* (2013.01); *G06T 2211/424* (2013.01)
USPC ............................ 382/128; 382/131; 382/260

(58) Field of Classification Search
CPC .................................................. G06T 2211/40
USPC ........................................................ 382/154
See application file for complete search history.

(56) References Cited

U.S. PATENT DOCUMENTS

| | | | | |
|---|---|---|---|---|
| 4,740,896 A | * | 4/1988 | Horiba et al. | ...................... 378/4 |
| 6,339,632 B1 | * | 1/2002 | Besson | ............................. 378/15 |
| 6,498,607 B1 | * | 12/2002 | Pfister et al. | ................... 345/423 |
| 6,724,856 B2 | | 4/2004 | De Man et al. | |
| 7,227,982 B2 | | 6/2007 | De Man et al. | |
| 7,412,110 B1 | * | 8/2008 | Worthington | ................. 382/279 |
| 7,881,552 B1 | * | 2/2011 | Gerber et al. | ................. 382/264 |
| 2002/0122133 A1 | * | 9/2002 | Ejima | ........................... 348/362 |

(Continued)

OTHER PUBLICATIONS

R. M. Lewitt, "Alternatives to voxels for image representation in iterative reconstruction algorithms," Phys. Med. Biol. 37(3), 705-716 (1992).*

(Continued)

*Primary Examiner* — Michelle Entezari
(74) *Attorney, Agent, or Firm* — Harness, Dickey & Pierce, P.L.C.

(57) ABSTRACT

Methods provided for forward and back-projection, which are referred to as separable footprint (SF) projectors: exemplified by the SF-TR and SF-TT projectors. These methods approximate the voxel footprint functions as 2D separable functions. Because of the separability of these footprint functions, calculating their integrals over a detector cell is greatly simplified and can be implemented efficiently. In some embodiments, the SF-TR projector uses trapezoid functions in the transaxial direction and rectangular functions in the axial direction. In some embodiments, the SF-TT projector uses trapezoid functions in both the axial and transaxial directions. Simulations and experiments showed that both SF projector methods are more accurate than conventional distance-driven (DD) projectors. Moreover, the SF-TT projector is more accurate than the SF-TR projector for rays associated with large cone angles. In some embodiments, the SF-TR projector has similar computation speed with the DD projector and the SF-TT projector is about two times slower.

18 Claims, 5 Drawing Sheets

(56) References Cited

U.S. PATENT DOCUMENTS

| | | |
|---|---|---|
| 2003/0194048 A1 | 10/2003 | De Man et al. |
| 2004/0013294 A1 | 1/2004 | De Man et al. |
| 2007/0065130 A1* | 3/2007 | Fukumoto et al. ............... 396/55 |
| 2009/0010380 A1* | 1/2009 | Gotoh .............................. 378/5 |
| 2011/0097007 A1* | 4/2011 | Zeng et al. .................... 382/260 |
| 2011/0150305 A1* | 6/2011 | Zeng et al. .................... 382/131 |

OTHER PUBLICATIONS

K. Mueller, R. Yagel, and J. J. Wheller, "Fast implementations of alge- braic methods for three-dimensional reconstruction from cone-beam data," IEEE Trans. Med. Imaging 18(6), 538-548 (1999)).*

A. Ziegler, T. Köhler, T. Nielsen, and R. Proska, "*Efficient projection and backprojection scheme for spherically symmetric basis functions in divergent beam geometry*," (Dec. 2006), Med. Phys., vol. 33, No. 12, pp. 4653-4663.

C. Riddell and Y. Trousset, "*Rectification for cone-beam projection and backprojection*," (Jul. 2006), IEEE Trans. Med. Imag., vol. 25, No. 7, pp. 950-962.

A. Ziegler, T. Nielsen, and M. Grass, "*Iterative reconstruction of a region of interest for transmission tomography*," (Apr. 2008), Med. Phys., vol. 35, No. 4, pp. 1317-1327.

Y. Long, J. Fessler, and J. Balter, "*3D Forward and Back-Projection for X-Ray CT Using Separable Footprints*," (Nov. 2010), IEEE Trans. Med. Imag., vol. 29, No. 11, pp. 1839-1850.

B. DeMan and S. Basu, "*Distance-driven projection and backprojection in three dimensions*," (May 2004), Phys. Med. Biol., vol. 49, pp. 2463-2475.

* cited by examiner

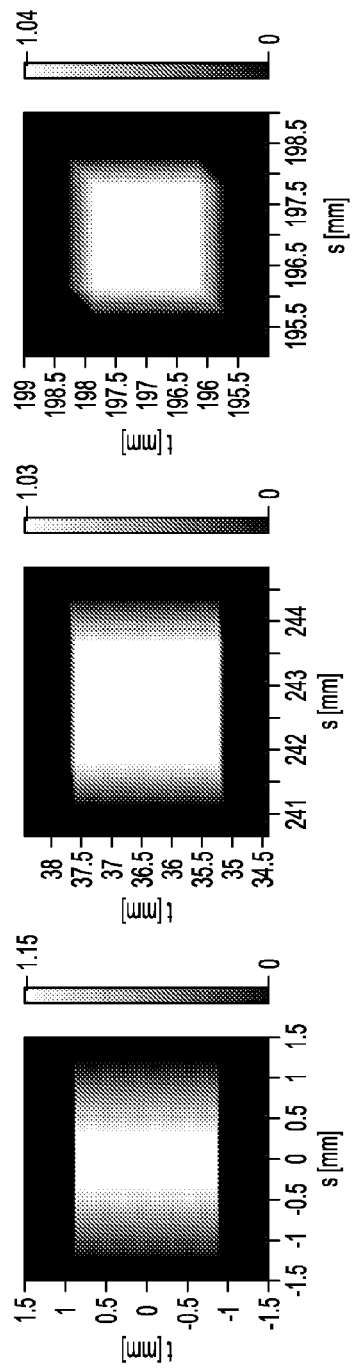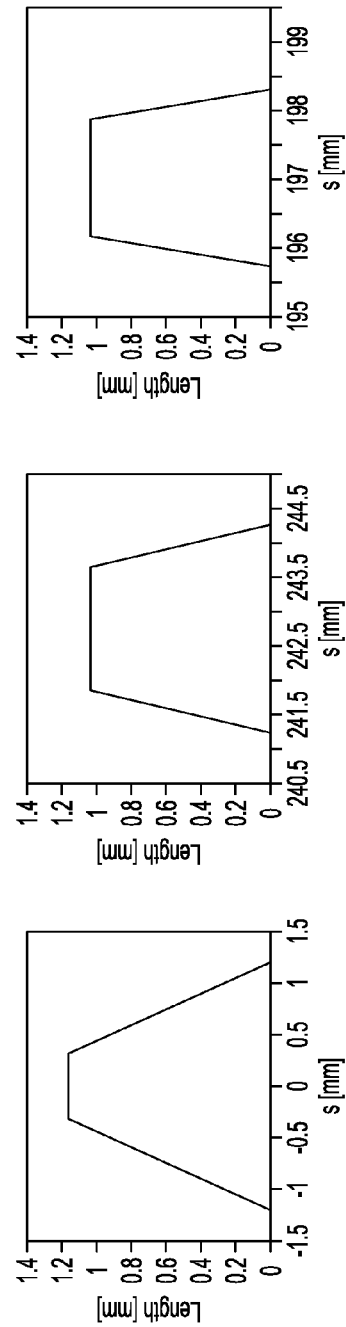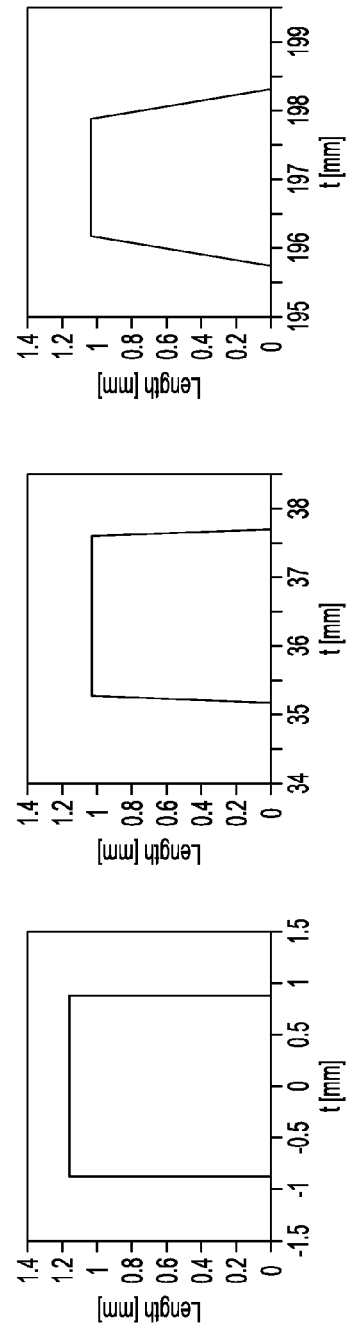
Fig-2A
Fig-2B
Fig-2C

THREE-DIMENSIONAL FORWARD AND BACK PROJECTION METHODS

CROSS-REFERENCE TO RELATED APPLICATIONS

This application claims the benefit of U.S. Provisional Application No. 61/378,041, filed on Aug. 30, 2010. The entire disclosure of the above application is incorporated herein by reference.

GOVERNMENT INTEREST

This invention was made with government support under CA059827 awarded by the National Institutes of Health. The Government has certain rights in the invention.

FIELD

The present disclosure relates to X-ray computed tomography (CT) and, more particularly, relates to three-dimensional (3D) forward and backward projection methods. The invention also is applicable to other tomographic imaging modalities, such as position emission tomography (PET), and tomosynthesis imaging, and to image-guided therapy applications.

BACKGROUND AND SUMMARY

This section provides background information related to the present disclosure that is not necessarily prior art. This section also provides a general summary of the disclosure, and is not a comprehensive disclosure of its full scope or all of its features.

According to the principles of the present teachings, methods are provided for forward and back-projection, which are referred to as separable footprint (SF) projectors: the SF-TR and SF-TT projectors being exemplary embodiments. These methods approximate the voxel footprint functions as 2D separable functions. Because of the separability of these footprint functions, calculating their integrals over a detector cell is greatly simplified and can be implemented efficiently. In some embodiments, the SF-TR projector uses trapezoid functions in the transaxial direction and rectangular functions in the axial direction. In some embodiments, the SF-TT projector uses trapezoid functions in both the axial and transaxial directions. Simulations and experiments showed that both SF projector methods are more accurate than conventional distance-driven (DD) projectors. Moreover, the SF-TT projector is more accurate than the SF-TR projector for rays associated with large cone angles. In some embodiments, the SF-TR projector has similar computation speed with the DD projector and the SF-TT projector is about two times slower.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2C are a series of illustrations of exact footprint functions and their associated profiles for 1 mm$^3$ voxels centered at the origin (left series—(i) series)), (100, 150, 15) mm (center series—(ii) series), and (93, 93, 93) mm (right series-(iii) series));

Figure 5A:
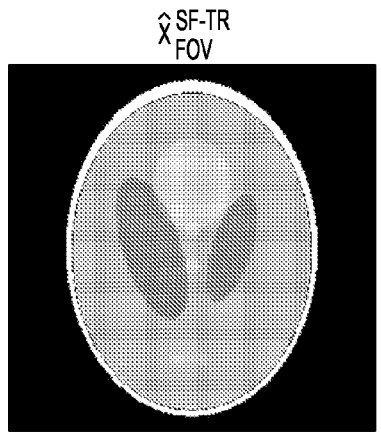
Figure 5B:
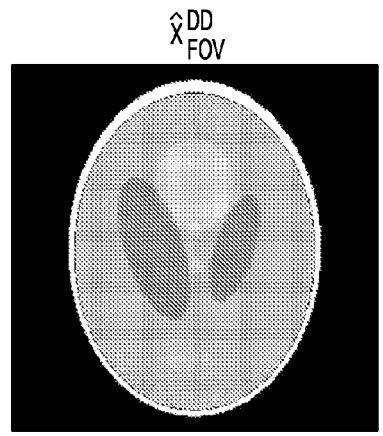
Figure 6A:
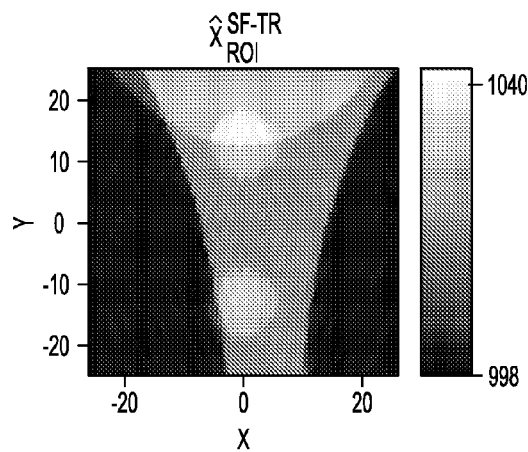
Figure 6B:
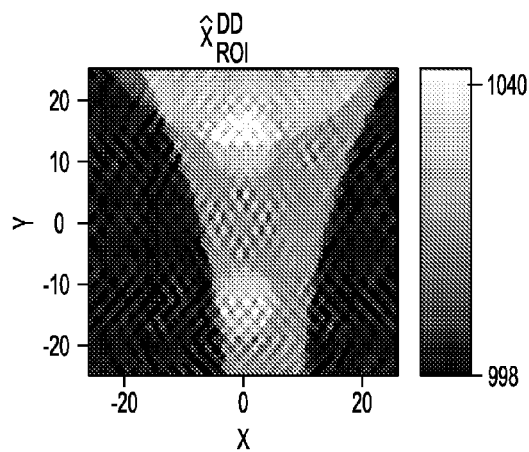
Figure 6C:
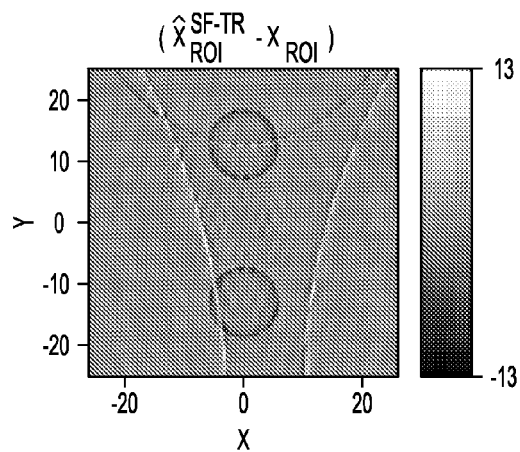
Figure 6D:
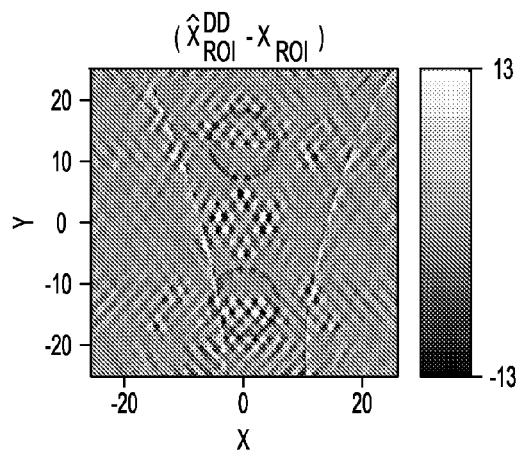

FIGS. 5A-5B are a series of axial views of FOV images reconstructed by the interactive method (PWLS-CG) using the SF and DD methods, respectively, wherein FIG. 5A uses a SF-TR projector and FIG. 5B uses a DD projector; and FIGS. 6A-6D are a series of axial views of ROI images reconstructed by the interactive method (PWLS-CG) using the SF-TR and DD methods, respectively (FIGS. 6A, 6B), and the associate error (FIGS. 6C, 6D), wherein FIGS. 6A, 6C use a SF-TR projector and FIGS. 6B, 6D use a DD projector.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

I INTRODUCTION

Iterative statistical methods for 3D tomographic image reconstruction offer numerous advantages such as the potential for improved image quality and reduced dose, as compared to the conventional methods such as filtered back-projection (FBP). They are based on models for measurement statistics and physics, and can easily incorporate prior information, the system geometry and the detector response.

The main disadvantage of statistical reconstruction methods is the longer computation time of iterative algorithms that are usually required to minimize certain cost functions. For most iterative reconstruction methods, each iteration requires one forward projection and one back-projection, where the forward projection is roughly a discretized evaluation of the Radon transform, and the back-projector is the adjoint of the forward projector. These operations are the primary computational bottleneck in iterative reconstruction methods, particularly in 3D image reconstruction. Forward projector methods are also useful for making digitally rendered radiographs (DRR).

Traditional forward and back-projectors compute the intersection lengths between each tomographic ray and each image basis function. Many methods for accelerating this process have been proposed. Due to the finite size of detector cells, averaging the intersection lengths over each detector cell is considered to be a more precise modeling. Mathematically, it is akin to computing the convolution of the footprint of each basis function and some detector blur, such as a 2D rectangular function.

Any projector method must account for the geometry of the imaging system. Cone-beam geometries are needed for axial and helical cone-beam X-ray computed tomography (CT). In 3D parallel-beam geometry projection space, there are four independent indices ($\mu$, $\nu$, $\phi$, $\theta$). The ray direction is specified by ($\phi$, $\theta$) where $\phi$ and $\theta$ denote the azimuthal and polar angle of the ray respectively and ($\mu$, $\nu$) denote the local coordinates on a 2D area detector. In contrast, axial cone-beam projection space is characterized by three independent indices (s, t, $\beta$) and two distance parameters ($D_{s0}$, $D_{0d}$), where $\beta$ denotes the angle of the source point counter-clockwise from the y axis, (s, t) denote the detector coordinates, $D_{s0}$ denotes the source to rotation center distance and $D_{0d}$ denotes the isocenter to detector distance. (See FIG. 1). The axial cone-beam geometry is a special case of helical cone-beam geometry with zero helical pitch.

The divergence of tomographic rays in the cone-beam geometry causes depth-dependent magnification of image basis functions, i.e., voxels close to the X-ray source cast larger shadows on the detector than voxels close to the detector. This complication does not appear in the parallel-beam geometry (e.g., in certain PET systems). Therefore, many existing projection and back-projection methods designed for 3D parallel-beam geometry are not directly suitable for cone-beam geometry.

A variety of projection methods for 3D cone-beam geometries have been proposed. All methods provide some compromise between computational complexity and accuracy. Among these, spherically symmetric basis functions (blobs) have many advantages over simple cubic voxels or other basis functions for the image representation, e.g., their appearance is independent of the viewing angle. However, evaluating integrals of their footprint functions is computationally intensive. Ziegler et al. (a) stored these integrals in a lookup-table. If optimized blobs are used and high accuracy is desired, the computation of forward and back-projection is still expensive due to loading a large table and the fact that blobs intersect many more tomographic rays than voxels.

Rectification techniques were introduced to accelerate the computation of cone-beam forward and backward projections. Riddell et al. resampled the original data to planes that are aligned with two of the reconstructed volume main axes, so that the original cone-beam geometry can be replaced by a simpler geometry that involves only a succession of plane magnifications. In iterative methods, resampled measurements can simplify forward and back-projection each iteration. However, resampling involves interpolation that may slightly decrease spatial resolution. Another drawback of this method is that the usual assumption of statistical independence of the original projection data samples no longer holds after rectification, since interpolation introduces statistical correlations.

The distance-driven (DD) projector is a current state-of-the-art method. It maps the horizontal and vertical boundaries of the image voxels and detector cells onto a common plane such as xz or yz plane, approximating their shapes by rectangles. (This step is akin to rectification). It calculates the lengths of overlap along the x (or y) direction and along the z direction, and then multiplies them to get the area of overlap. The DD projector has the largest errors for azimuthal angles of the X-ray source that are around odd multiples of $\pi/4$, because the transaxial footprint is approximately triangular rather than rectangular at those angles.

This disclosure describes new approaches for 3D forward and back-projection that we call the separable footprint (SF) projectors, exemplified by the SF-TR and SF-TT projectors. They approximate the voxel footprint functions as 2D separable functions. This approximation is reasonable for typical axial or helical cone-beam CT geometries and for typical PET geometries. The separability of these footprint functions greatly simplifies the calculation of their integrals over a detector cell and allows efficient implementation of the SF projectors. The SF-TR projector uses trapezoid functions in the transaxial direction and rectangular functions in the axial direction, whereas the SF-TT projector uses trapezoid functions in both directions. It is accurate to use rectangle approximation in the axial direction for cone-beam geometries with small cone angles (<2°) such as the multi-slice detector geometries, and to use trapezoid approximation for CT systems with larger cone angles (>10°) such as flat-panel detector geometries. Other functions besides rectangles and trapezoids may also be suitable.

Our studies showed that both SF projector methods are more accurate than the distance-driven (DD) projector. In particular, the SF methods reduce the errors around odd multiples of $\pi/4$ seen with DD. The SF-TT projector is more accurate than the SF-TR projector for voxels associated with large cone angles. The SF-TR projector has similar computation speed with the DD projector and the SF-TT projector is about 2 times slower.

To balance computation and accuracy, one may combine the SF-TR and SF-TT projector, that is, to use the SF-TR projector for voxels associated with small cone angles such as voxels near the plane of the X-ray source where the rectangle approximation is adequate, and use the SF-TT projector for voxels associated with larger cone angles. Other combinations of approximations may also be suitable, where the combination may depend on any of the voxel location or the detector cell location or combinations thereof.

The organization of this disclosure is as follows. Section II reviews the cone-beam geometry and projection, describes the cone-beam 3D system model. and presents the analytical formula of cone-beam projections of voxel basis functions. Section III introduces the SF projectors and contrasts the SF projectors with DD projector. Section IV gives simulation results, including accuracy and speed comparison between the SF-TR, SF-TT and DD projector as standalone modules and within iterative reconstruction. Finally, conclusions are presented in Section V.

II CONE-BEAM PROJECTION

II.1 Cone-Beam Geometry

Figure 1:
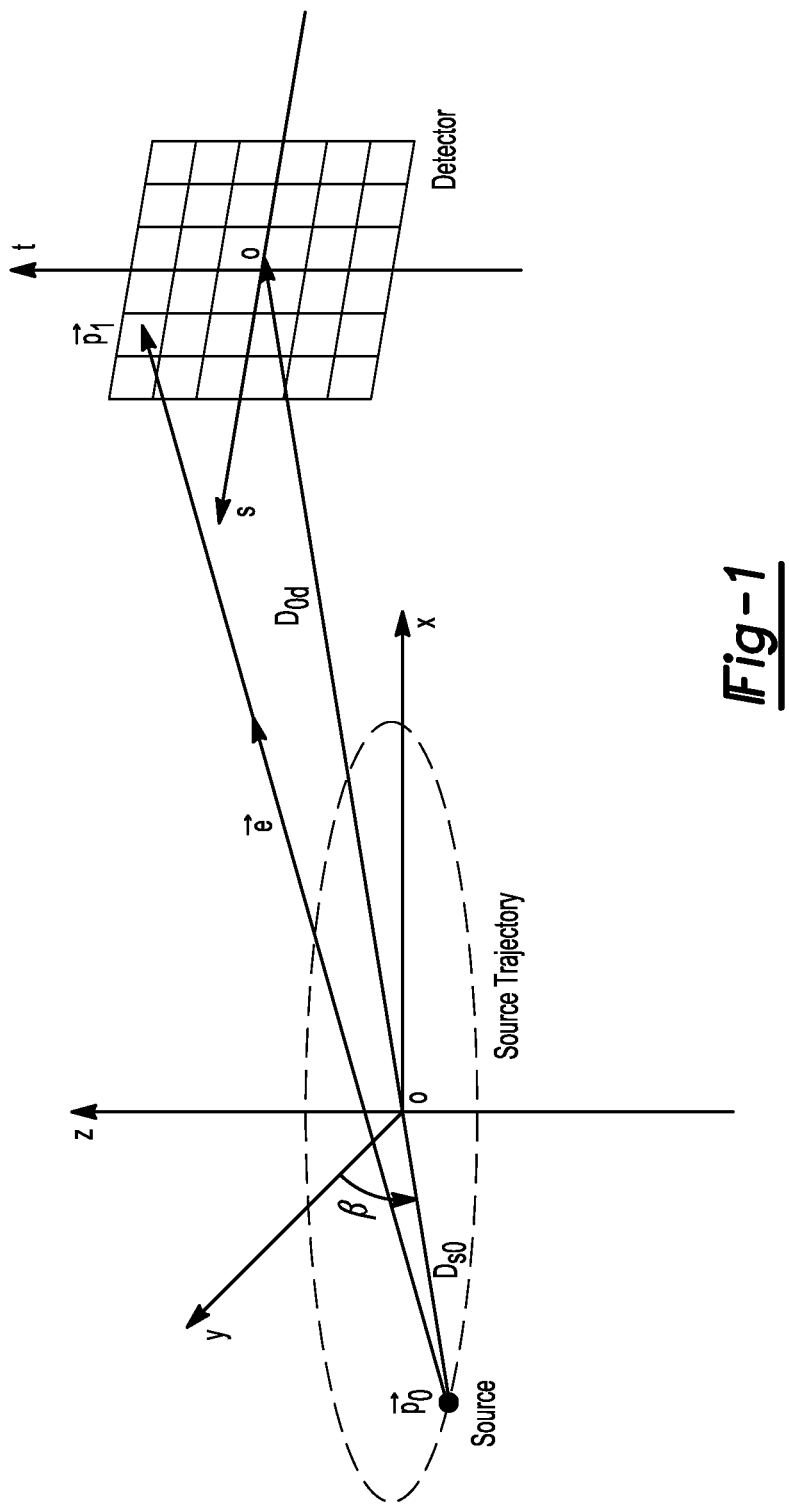
FIG. 1 illustrates an exemplary axial cone-beam flat-detector geometry according to the principles of the present teachings—the method also is applicable to systems with curved detectors.

For simplicity of presentation, we focus on the flat-detector axial cone-beam geometry (see FIG. 1). The methods generalize easily to arc detectors and helical geometries among others.

The X-ray source lies on points on a circle of radius $D_{s0}$ centered at the rotation center on the $z=0$ plane. The source position $\vec{p}_0$ can be parameterized as follows:

$$\vec{p}_0 = \begin{pmatrix} -D_{s0}\sin\beta \\ D_{s0}\cos\beta \\ 0 \end{pmatrix}, \quad (1)$$

where $D_{s0}$ is the source to rotation center distance and $\beta$ denotes the angle of the source point counter-clockwise from the y axis. For simplicity, we present the case of an ideal point source of X-rays. To partially account for non-ideal X-ray sources, one can modify the footprint function in (20) and (26) below.

Let (s, t) denote the local coordinates on the 2D detector plane, where the s-axis is perpendicular to the z-axis, and the t-axis is parallel to the z-axis. A point on the 2D detector can be expressed as $$\vec{p}_1 = \begin{pmatrix} s\cos\beta + D_{0d}\sin\beta \\ s\sin\beta - D_{0d}\cos\beta \\ t \end{pmatrix}, \quad (2)$$

where $D_{0d}=D_{sd}-D_{s0}$ is the isocenter to detector distance. The direction vector of a ray from $\vec{p}_0$ to $\vec{p}_1$ can then be expressed as $$\vec{e} = \frac{\vec{p}_1 - \vec{p}_0}{\|\vec{p}_1 - \vec{p}_0\|} = \begin{pmatrix} \sin\varphi\cos\theta \\ -\cos\varphi\cos\theta \\ \sin\theta \end{pmatrix}, \quad (3)$$

where $$\gamma = \gamma(s) \triangleq \arctan\left(\frac{s}{D_{sd}}\right) \quad (4)$$

$$\varphi = \varphi(s, \beta) \triangleq \gamma(s) + \beta \quad (5)$$

$$\theta = \theta(s, t) \triangleq -\arctan\left(\frac{t}{\sqrt{s^2 + D_{sd}^2}}\right), \quad (6)$$

and $\varphi$ and $\theta$ denote the azimuthal and polar angle of the ray from $\vec{p}_0$ to $\vec{p}_1$ respectively.

The cone-beam projections of a 3D object $f(\vec{x})$ where $\vec{x}=(x, y, z)$, are given by $$p(s,t;\beta)=\int_{\mathcal{L}(s,t,\beta)} f(\vec{x})dl, \quad (7)$$

where the integral is along the line segment:

$$\mathcal{L}(s, t, \beta) = \{\vec{p}_0 + l\vec{e}: l \in [0, L_p]\} \quad (8)$$

$$L_p \triangleq \sqrt{D_{sd}^2 + s^2 + t^2}.$$

For a point $\vec{x}=(x, y, z)$ between the source and detector, the projected s coordinate of it is $$\tau(\beta; x, y) = D_{sd}\frac{\tau_p(\beta; x, y)}{d_s(\beta; x, y)}, \quad (9)$$

where $$\tau_p(\beta; x, y) \triangleq x\cos\beta + y\sin\beta, \quad (10)$$

$$d_s(\beta; x, y) \triangleq D_{s0} - \tau_\perp(\beta; x, y),$$

$$\tau_\perp(\beta; x, y) \triangleq -x\sin\beta + y\cos\beta.$$

The projected t coordinate is $$t(\beta; x, y, z) = z\frac{D_{sd}}{d_s(\beta; x, y)}. \quad (11)$$

The azimuthal and polar angles of the ray connecting the source and $\vec{x}$ are $$\varphi(\beta; x, y) = \beta + \arctan\left(\frac{\tau_p(\beta; x, y)}{d_s(\beta; x, y)}\right) \quad (12)$$

$$\theta(\beta; x, y, z) = -\arctan\left(\frac{z}{\sqrt{\tau_p^2 + d_s^2}}\right). \quad (13)$$

II.2 Cone-Beam 3D System Model

In the practice of iterative image reconstruction, rather than operating on a continuous object $f(\vec{x})$, we forward project a discretized object represented by a common basis function $\beta_0(\vec{x})$ superimposed on a $N_1 \times N_2 \times N_3$ Cartesian grid as follows:

$$f(\vec{x}) = \sum_{\vec{n}} f[\vec{n}]\beta_0((\vec{x} - \vec{c}[\vec{n}])\oslash\vec{\Delta}), \quad (14)$$

where the sum is over the $N_1 \times N_2 \times N_3$ lattice that is estimated and $\vec{c}[\vec{n}]=(c_1[\vec{n}], c_2[\vec{n}], c_3[\vec{n}])$ denotes the center of the $\vec{n}$th basis function and $[\vec{n}]=(n_1, n_2, n_3) \in Z^3$. The grid spacing is $\vec{\Delta}=(\Delta_1, \Delta_2, \Delta_3)$, and $\emptyset$ denotes element-wise division. We consider the case $\Delta_1=\pm\Delta_2$ hereafter, but we allow $\Delta_1 \neq \Delta_3$, because voxels are often not cubic.

Most projection/back-projection methods use a linear model that ignores the "exponential edge gradient effect" caused by the nonlinearity of Beer's law. We adopt the same type of approximation here. Assume that the detector blur h(s, t) is shift invariant, independent of β and acts only along the s and t coordinates. Then the ideal noiseless projections satisfy $$\bar{y}_\beta[s_k, t_l] = \iint h(s_k-s, t_l-t)p(s,t;\beta)dsdt, \quad (15)$$

where p(s, t; β) is the 3D projection of $f(\vec{x})$ given by (7), and $(s_k, t_l)$ denotes the center of detector cell specified by indices (k, l). The methods we present are applicable to arbitrary samples $(s_k, t_l)$, but for simplicity of presentation and implementation we focus on the case of uniformly spaced samples:

$$s_k=(k-w_s)\Delta_S, k=0,\ldots,N_s-1,$$

$$t_l=(l-w_t)\Delta_T, l=0,\ldots,N_t-1$$

$$w_s=(N_s-1)/2+c_s$$

$$w_t=(N_t-1)/2+c_t, \quad (16)$$

where $\Delta_S$ and $\Delta_T$ denote the sample spacing in s and t respectively. The user-selectable parameters $c_s$ and $c_t$ denote offsets for the detector, e.g., $c_s=\frac{1}{4}$ corresponds to a quarter detector offset.

Substituting the basis expansion model (14) for the object into (15) and using (7) leads to the linear model $$\bar{y}_\beta[s_k, t_l] = \sum_{\vec{n}} a_\beta[s_k, t_l; \vec{n}]f[\vec{n}], \quad (17)$$

where the elements of system matrix A are samples of the following cone-beam projection of a single basis function centered at $\vec{c}[\vec{n}]$:

$$\alpha_\beta[s_k, t_l; \vec{n}]=F(s_k, t_l; \beta; \vec{n}), \quad (18)$$

where the "blurred footprint" function is $$F(s_k, t_l; \beta; \vec{n}) \triangleq \iint h(s_k-s, t_l-t)q(s, t; \beta; \vec{n})dsdt, \quad (19)$$

and q(s, t; β; $\vec{n}$) denotes the cone-beam footprint of basis function $\beta_0((\vec{x}-\vec{c}[\vec{n}])\Pi\vec{\Delta})$, i.e., $$q(s,t;\beta;\vec{n}) = \int_{L(s,t,\beta)} \beta_0((\vec{x}-\vec{c}[\vec{n}])\Pi\vec{\Delta})dl. \quad (20)$$

Computing the footprint of the voxel is also known as "splatting".

The goal of forward projectors is to compute (17) rapidly but accurately. Although the system matrix A is sparse, it is impractical to precompute and store even the nonzero system matrix values for the problem sizes of interest in cone-beam CT, so practical methods (including our proposed approach) essentially compute those values on the fly.

We focus on a simple separable model for the detector blur $$h(s, t) = \frac{1}{r_s r_t} rect\left(\frac{s}{r_s}\right) rect\left(\frac{t}{r_t}\right), \quad (21)$$

where $r_s$ and $r_t$ denote the width along s and t respectively. This model accounts for the finite size of the detector elements. Note that $r_s$ and $r_t$ can differ from the sample spacing $s_k-s_{k-1}$ and $t_l-t_{l-1}$ to account for detector gaps.

II.3 Footprints of Voxel Basis Functions

We focus on cubic voxel basis functions hereafter, but one could derive analytical formulas for footprints of other basis functions. The cubic voxel basis function is given by, $$\beta_0(\vec{x}) = rect(x)rect(y)rect(z) \quad (22)$$

$$= \mathbb{1}_{\{|x|\leq 1/2\}}\mathbb{1}_{\{|y|\leq 1/2\}}\mathbb{1}_{\{|z|\leq 1/2\}},$$

where $\mathbb{1}_{\{\cdot\}}$ denotes the indicator function.

Substituting (22) into (20), the analytical formula for the cone-beam projection footprint of the $\vec{n}$th basis function is:

$$q(s, t; \beta; \vec{n}) = \int_0^{L_p} \beta_0((\vec{p}_0 + l\vec{e} - \vec{c}[\vec{n}])\emptyset\vec{\Delta})dl \quad (23)$$

$$= \int_0^{L_p} \mathbb{1}_{\{|d_1+le_1|\leq\Delta_1/2\}}\mathbb{1}_{\{|d_2+le_2|\leq\Delta_2/2\}}$$

$$\mathbb{1}_{\{|d_3+le_3|\leq\Delta_3/2\}}dl$$

$$= a_1 \cdot a_2 \cdot a_3 \cdot [l_{max} - l_{min}]_+,$$

where $\vec{e}=(e_1, e_2, e_3)$ was defined in (3), $$[x]_+ \triangleq \max(x, 0)$$

and $$\vec{d} \triangleq \vec{p}_0 - \vec{c}[\vec{n}] = (d_1, d_2, d_3), \quad (24)$$

$$a_1 = \begin{cases} \mathbb{1}_{\{|d_1|\leq\Delta_1/2\}}, & \sin\varphi = 0 \\ 1, & \sin\varphi \neq 0, \end{cases}$$

$$a_2 = \begin{cases} \mathbb{1}_{\{|d_2|\leq\Delta_2/2\}}, & \cos\varphi = 0 \\ 1, & \cos\varphi \neq 0, \end{cases}$$

$$a_3 = \begin{cases} \mathbb{1}_{\{|d_3|\leq\Delta_3/2\}}, & \sin\varphi = 0 \\ 1, & \sin\varphi \neq 0, \end{cases}$$

$$l_{max} = \min\{L_p, l_+^1, l_+^2, l_+^3\},$$

$$l_{min} = \max\{0, l_-^1, l_-^2, l_-^3\},$$

$$l_+^i = \begin{cases} \max\left\{\frac{\Delta_i/2-d_i}{e_i}, \frac{-\Delta_i/2-d_i}{e_i}\right\}, & e_i \neq 0 \\ \infty, & e_i = 0, \end{cases}$$

$$l_-^i = \begin{cases} \min\left\{\frac{\Delta_i/2-d_i}{e_i}, \frac{-\Delta_i/2-d_i}{e_i}\right\}, & e_i \neq 0 \\ -\infty, & e_i = 0. \end{cases}$$

For typical cone-beam geometries, polar angles θ of rays are much smaller than 90°, so there is no need to consider the case of cos θ=0. Combining (18), (19) and (23) yields the "ideal" projector for cubic voxels in cone-beam CT.

III SEPARABLE FOOTPRINT (SF) PROJECTOR

It would be expensive to exactly compute the true footprint (23) and the "blurred footprint" (19) for the voxel basis function on the fly, so appropriate approximations of the "blurred footprint" (19) are needed to simplify the double integral calculation.

To explore alternatives, we simulated a flat-detector cone-beam geometry with $D_{s0}$=541 mm and $D_{sd}$=949 mm. We computed cone-beam projections of voxels analytically using (23) at sample locations $(n\Delta_S, m\Delta_T)$ where $\Delta_S=\Delta_T$=0.001 mm and n, m∈Z. The left column of FIG. 2 shows the exact footprint function and its profiles for a voxel with $\Delta_1=\Delta_2=\Delta_3$=1 mm centered at the origin when β=30°. The center column of FIG. 2 shows those of a voxel centered at (100, 150, 15) mm when β=0°. The azimuthal and polar angle of the ray connecting the source and this voxel center are 14.3° and 2.1° respectively. The cone angle of a typical 64-slice cone-beam CT geometry is about 2°. The right column of FIG. 2 shows those of a voxel centered at (93, 93, 93) mm when β=0°. The azimuthal and polar angle of the ray connecting the source and this voxel center are 11.7° and 11.5° respectively. The cone angle of a typical cone-beam CT geometry with 40×40 cm² flat-panel detector is about 12°. The first two true footprints look like 2D separable functions. The third footprint is approximately separable except for small areas at the upper left and lower right corner.

Inspired by shapes of the true footprints (see FIG. 2), we approximate them as follows, $$q(s, t; \beta; \vec{n}) \approx q_{ap}(s, t; \beta; \vec{n}) \triangleq l(s, t; \beta; \vec{n})q_{sf}(s, t; \beta; \vec{n}), \quad (25)$$

where $q_{sf}(s, t; \beta; \vec{n})$ denotes a 2D separable function with unit maximum amplitude, $$q_{sf}(s, t; \beta; \vec{n}) \triangleq q_1(s; \beta; \vec{n})q_2(t; \beta; \vec{n}), \quad (26)$$

where $q_1(s; \beta; \vec{n})$ and $q_2(t; \beta; \vec{n})$ denote the approximating functions in s and t respectively. In (25), $l(s, t; \beta; \vec{n})$ denotes the "amplitude" of $q_{sf}(s, t; \beta; \vec{n})$.

For small basis functions and narrow blurs h(s, t), the angles of rays within each detector cell that intersect each basis function are very similar, so $l(s, t; \beta; \vec{n})$ is much smoother than h(s, t) and q(s, t; β; $\vec{n}$). Substituting (25) into (19) leads to $$F(s, t; \beta; \vec{n}) \approx F_{sf}(s, t; \beta; \vec{n}) \triangleq h(s, t) ** [l(s, t; \beta; \vec{n})q_{sf}(s, t; \beta; \vec{n})] \approx \quad (27)$$
$$l(s, t; \beta; \vec{n})[h(s, t) ** q_{sf}(s, t; \beta; \vec{n})],$$

where the inequality uses the fact that $l(s, t; \beta; \vec{n})$ is approximately a constant over each detector cell. The value $l(s_k, t_l; \beta; \vec{n})$ denotes this constant for detector cell $(s_k, t_l)$, and * denotes 2D convolution.

If the detector blur is also modeled as separable, i.e., $$h(s,t)=h_1(s)h_2(t), \quad (28)$$

then the blurred footprint functions (27) have the following separable approximation:

$$F_{sf}(s_k, t_l; \beta; \vec{n}) = l(s_k, t_l; \beta; \vec{n})F_1(s_k; \beta; \vec{n})F_2(t_l; \beta; \vec{n}), \quad (29)$$

where $$F_1(s_k; \beta; \vec{n}) \triangleq \int h_1(s_k - s)q_1(s; \beta; \vec{n})ds \quad (30)$$

$$F_2(t_l; \beta; \vec{n}) \triangleq \int h_2(t_l - t)q_2(t; \beta; \vec{n})dt.$$

III.1 Amplitude Approximation Methods

One natural choice for the amplitude function l(·) is the following voxel-dependent factor that we call the A3 method:

$$l(s_k, t_l; \beta; \vec{n}) = l_3(\beta; \vec{n}) \triangleq l_{\varphi_0} \cdot l_{\theta_0} \quad (31)$$

where $$l_{\varphi_0} \triangleq \frac{\Delta_1}{\max\{|\cos(\varphi_0)|, |\sin(\varphi_0)|\}} \quad (32)$$

$$l_{\theta_0} \triangleq \frac{1}{|\cos(\theta_0)|}, \quad (33)$$

where $\varphi_0=\varphi_0(\beta, \vec{n})$ and $\theta_0=\theta_0(\beta, \vec{n})$ denote the azimuthal and polar angles of the ray connecting the source and center of the $\vec{n}$th voxel. They can be computed by (12) and (13). Since this voxel-dependent amplitude depends on angles ($\theta_0$, $\varphi_0$) and β, the approximated footprint $q_{ap}(s, t; \beta; \vec{n})$ is separable with respect to s and t too. However, the dependence on voxel centers $\vec{c}[\vec{n}]$ requires expensive computation. One must compute $N_1 \times N_2 \times N_3 \times N_\beta$ different $l_{\theta_0}$ values and $N_1 \times N_2 \times N_\beta$ different $l_{\varphi_0}$ values, where $N_\beta$ denotes the number of projection views. In addition, computing $l_{\theta_0}$ and $l_{\varphi_0}$ for each voxel at each projection view involves either trigonometric operations (cos, sin and $\tan^{-1}$) or square and square root operations to directly evaluate cos and sin.

To accelerate computation of the SF projector, we propose a voxel-ray-dependent amplitude named the A2 method:

$$l_2(s_k, t_l; \beta; \vec{n}) \triangleq l_{\varphi_0} \cdot l_{\theta(s_k, t_l)} \quad (34)$$

$$l_{\theta(s_k, t_l)} \triangleq \frac{1}{|\cos(\theta(s_k, t_l))|}, \quad (35)$$

where $\theta(s_k, t_l)$ given in (6) is the polar angle of the ray connecting the source and detector center $(s_k, t_l)$. There are many fewer tomographic rays ($N_s \times N_t$) than voxels in a 3D image ($N_1 \times N_2 \times N_\beta$) and $\theta(s_k, t_l)$ does not depend on β for flat detector geometries (see (6)), so using (34) saves substantial computation versus (31).

We also investigated a ray-dependent amplitude named the A1 method:

$$l_1(s_k, t_l; \beta) \triangleq l_{\varphi(s_k;\beta)} \cdot l_{\theta(s_k, t_l)} \quad (36)$$

-continued $$l_{\varphi(s_k;\beta)} \triangleq \frac{\Delta_1}{\max\{|\cos(\varphi(s_k;\beta))|, |\sin(\varphi(s_k;\beta))|\}}, \quad (37)$$

where $\phi(s_k; \beta)$ given in (5) is the azimuthal angle of the ray connecting the source and detector cell center $(s_k, t_l)$. For each $\beta$, there are $N_s$ different $l_{\varphi(s_k;\beta)}$ for the A1 method and $N_1 \times N_2$ different $l_{\varphi_0}$ for the A2 method.

These amplitude methods are similar to Joseph's method where the triangular footprint function is scaled by 1/max ($|\cos \phi|, |\sin \phi|$) for 2D fan-beam geometry. All three methods have similar accuracies, but the A3 method is much slower than the other two (see Section IV.1). Thus we do not recommend using the A3 amplitude in the SF projector method. Hereafter, we refer to (29) with either (34) or (36) as "the SF method".

III.2 SF Projector with Trapezoid/Rectangle Function (SF-TR)

Inspired by the shapes of the true footprints associated with small cone angles (see the first two columns of FIG. 2), we approximate them as 2D separable functions with trapezoid functions in the transaxial direction and rectangular functions in the axial direction. This approximation is reasonable for typical multi-slice cone-beam geometries, where the azimuthal angles $\phi$ of rays cover the entire 360° range since the X-ray source rotates around the z axis, whereas the polar angles $\theta$ of rays are small (less than 2°) since the cone angle is small.

The approximating function in the s direction is $$q_1(s; \beta; \vec{n}) \triangleq \text{trap}(s; \tau_0, \tau_1, \tau_2, \tau_3) \quad (38)$$

$$= \begin{cases} \frac{s - \tau_0}{\tau_1 - \tau_0}, & \tau_0 < s < \tau_1 \\ 1, & \tau_1 \leq s \leq \tau_2 \\ \frac{\tau_3 - s}{\tau_3 - \tau_2}, & \tau_2 < s < \tau_3 \\ 0, & \text{otherwise}, \end{cases}$$

where $\tau_0, \tau_1, \tau_2$ and $\tau_3$ denote vertices of the trapezoid function that we choose to match the exact locations of those of the true footprint function in the s direction. They are the projected s coordinates of four corner points located at $(c_1[\vec{n}] \pm \Delta_1/2, c_2[\vec{n}] \pm \Delta_2/2)$ for all z.

The approximating function in the t direction is $$q_2(t; \beta; \vec{n}) \triangleq \text{rect}\left(\frac{t - t_0}{w_{t0}}\right), \quad (39)$$

where $$t_0 \triangleq \frac{t_+ + t_-}{2}, \quad (40)$$

$$w_{t0} \triangleq t_+ - t_-,$$

where $t_+$ and $t_-$ denote the boundaries of the rectangular function which we choose to be the projected t coordinates of the two endpoints of the axial midline of the voxel. Those endpoints are located at $\vec{c}[\vec{n}] \pm (0, 0, \Delta_3/2)$. Given $\beta$ and a point $\vec{x} = (x, y, z)$, the projected s and t coordinate of this point can be computed by (9) and (11). Since the boundaries of the separable function are determined by the projections of boundaries of the voxel basis function under the cone-beam geometry, the depth-dependent magnification is accurately modeled.

The blurred footprint functions (30) of this SF-TR projector are $$F_1(s_k; \beta; \vec{n}) = \frac{1}{r_s} \gamma\left(s_k - \frac{r_s}{2}, s_k + \frac{r_s}{2}\right), \quad (41)$$

and $$F_2(t_l; \beta; \vec{n}) = \frac{1}{r_t}\left[\min\left(t_l + \frac{r_t}{2}, t_+\right) - \max\left(t_l - \frac{r_t}{2}, t_-\right)\right]_+, \quad (42)$$

where $$\gamma(s_1, s_2) \triangleq \int_{s_1}^{s_2} \text{traps}(s; \tau_0, \tau_1, \tau_2, \tau_3) ds$$

$$= \gamma_1(\max(s_1, \tau_0), \min(s_2, \tau_1)) + \gamma_2(\max(s_1, \tau_1), \min(s_2, \tau_2)) + \gamma_3(\max(s_1, \tau_2), \min(s_2, \tau_3)),$$

$$\gamma_1(b_1, b_2) \triangleq \frac{1}{2(\tau_1 - \tau_0)}[(b_2 - \tau_0)^2 - (b_1 - \tau_0)^2] 1_{\{b_2 > b_1\}},$$

$$\gamma_2(b_1, b_2) \triangleq (b_2 - b_1) 1_{\{b_2 > b_1\}},$$

$$\gamma_3(b_1, b_2) \triangleq \frac{1}{2(\tau_3 - \tau_2)}[(b_1 - \tau_3)^2 - (b_2 - \tau_3)^2] 1_{\{b_2 > b_1\}}. \quad (43)$$

III.3 SF Projector with Trapezoid/Trapezoid Function (SF-TT)

Inspired by the shape of true footprint of a voxel associated with large cone angles (see the last column of FIG. 2), we approximate it as a 2D separable function with trapezoid functions in both the transaxial and axial direction. This trapezoid approximation in axial direction is reasonable for cone-beam geometries with large cone angles (>10°) such as flat-panel detector geometries.

Along s, the SF-TT projector uses the same trapezoid approximation as the SF-TR projector. The trapezoid footprint and the blurred footprint are given in (38) and (41).

The approximated footprint function in t is $$q_2(t; \beta; \vec{n}) \triangleq \text{trap}(t; \xi_0, \xi_1, \xi_2, \xi_3), \quad (44)$$

where $\xi_0, \xi_1, \xi_2$ and $\xi_3$ denote vertices of the trapezoid function. $\xi_0$ and $\xi_1$ are the smallest and largest one of the projected t coordinates of the lower four corners of the $\vec{n}$th voxel located at $(c_1[\vec{n}] \pm \Delta_1/2, c_2[\vec{n}] \pm \Delta_2/2, c_3[\vec{n}] - \Delta_3/2)$, and $\xi_2$ and $\xi_3$ are the smallest and largest one of the projected t coordinates of the upper four corners located at $(c_1[\vec{n}] \pm \Delta_1/2, c_2[\vec{n}] \pm \Delta_2/2, c_3[\vec{n}] + \Delta_3/2)$. The blurred footprint function in t is $$F_2(t_l; \beta; \vec{n}) = \frac{1}{r_t} \gamma\left(t_l - \frac{r_t}{2}, t_l + \frac{r_t}{2}\right), \quad (45)$$

where $\gamma$ is given in (43).

By choosing the vertices of the approximating footprints to match the projections of the voxel boundaries, the approximation adapts to the relative positions of the source, voxels and detector, as true footprints do. Take a voxel centered at the origin as an example. Its axial footprint is approximately a rectangular function (see the left figure in the third row of FIG. 2), instead of a trapezoid function. For this voxel trap(t; $\xi_0, \xi_1, \xi_2, \xi_3$) is almost a rectangle because $\xi_0 \approx \xi_1$ and $\xi_2 \approx \xi_3$ because $\xi_0, \xi_1, \xi_2,$ and $\xi_3$ are the projected t coordinates of four axial boundaries of this voxel.

III.4 Implementation of SF Projector

We use the system matrix model (18) with the separable footprint approach (29) for both forward and back projection, which ensures that the SF forward and back projector are exact adjoint operators of each other.

scaled the projections by $l_{\theta(s_k, t_l)}$ outside of the loop over voxels and computed $l_{\phi_0}$ outside the inner loop over z since it does not depend on z.

The SF methods require $O(N^4)$ operations for forward/back projection of a $N^3$ volume to/from $N^3$ samples of the cone-beam projections. There exist $O(N^3 \log N)$ methods for back-projection. However, those algorithms may not capture the distance-dependent effect of detector blur incorporated in the model (18). In 2D one can use the Fourier Slice Theorem

TABLE 1

Pseudo-code for the SF-TR forward projector with the A1 amplitude method (SF-TR-A1) and the A2 method (SF-TR-A2).

- Initialize projection view array to zero, i.e., $\bar{y}_\beta[s_k, t_l] = 0$ for $k = 0, \ldots, N_s - 1$ and $l = 0, \ldots, N_t - 1$
- For each row $n_1 = 0, 1, \ldots, N_1 - 1$ of $f[\vec{n}]$:
  1. For each column $n_2 = 0, 1, \ldots, N_2 - 1$:
     (a) Compute trapezoid vertices $\tau_0, \tau_1, \tau_2, \tau_3$ in (38) using (9).
     (b) Determine indices ($s_k$ values) of detector cells that intersect $[\tau_0, \tau_3]$, i.e.
         $\{k : [s_k - r_s/2, s_k + r_s/2] \cap [\tau_0, \tau_3] \neq \emptyset\}$.
     (c) Compute transaxial footprint $F_1(s_k; \beta; \vec{n})$ using (41) and (43) for all these $s_k$ values and store them.
     (d) Compute $l_{\phi 0}$ using (32) (SF-TR-A2 only)
     (e) For each slice $n_3 = 0, 1, \ldots, N_3 - 1$:
         i.   Determine indices ($t_l$ values) of detector cells that intersect $[t_-, t_+]$,
              i.e., $\{l : [t_l - r_t/2, t_l + r_t/2] \cap [t_-, t_+] \neq \emptyset\}$.
         ii.  For each $t_l$ value:
              A.   Compute $F_2(t_l; \beta; \vec{n})$ using (42).
              B.   For each $s_k$ value:
                   - Compute projection $p(s_k, t_l; \beta; \vec{n})$ where
                     $p = f[\vec{n}] F_1(s_k; \beta; \vec{n}) F_2(t_l; \beta; \vec{n})$ for SF-TR-A1,
                     $p = f[\vec{n}] l_{\phi 0} F_1(sk; \beta; \vec{n}) F_2(t_l; \beta; \vec{n})$ for SF-TR-A2.
                   - Update projection view $\bar{y}_\beta[s_k, t_l] += p$.
- Scale all the projection view by $l_1(s_k, t_l; \beta)$ using (36) for SF-TR-A1 or by $l_{\theta(s_k, t_l)}$ using (35) for SF-TR-A2.

Table 1 summaries the SF-TR projector with the A1 amplitude method (SF-TR-A1) and with the A2 method (SF-TR-A2) for a given projection view angle $\beta$. Implementing the SF-TT projector with these two amplitude methods is similar. Implementation of the back-projector is similar, except for scaling the projections at the beginning instead of the end. The key to efficient implementation of this method is to make the inner loop over z (or equivalently over $t_l$), because the values of $F_1(s_k; \beta; \vec{n})$ are independent of z and $t_l$ so they are precomputed prior to that loop. Because (11) is linear in z, the first value of $t_\pm$ for a given (x, y) position can be computed prior to the inner loop over z, and subsequent values can be computed by simple incremental updates. Thus only simple arithmetic operations and conditionals are needed for evaluating $F_2(t_l; \beta; \vec{n})$ in that inner loop; all trigonometric computations occur outside that loop. Note that this separable footprint approach does not appear to be particularly advantageous for 2D fan-beam forward and backprojection because computing the transaxial footprint $F_1(s_k; \beta; \vec{n})$ requires trigonometric operations. The compute efficiency here comes from the simple rectangular footprint approximation in the axial direction. More computation is needed for the SF-TT method because it uses trapezoids in the axial direction instead rectangles.

The implementation of amplitude $l(s_k, t_l; \beta; \vec{n})$ in (29) for the A1 and A2 methods are different. For the A1 method, for each $\beta$ the amplitude $l_1(s_k, t_l; \beta)$ is implemented by scaling projections outside the loop over voxels since it depends on detector cells only. For the A2 method, we implemented the two terms ($l_{\phi_0}$ and $l_{\theta(s_k, t_l)}$) of $l_2(s_k, t_l; \beta; \vec{n})$ separately. We to develop $O(N^2 \log N)$ methods, but it is unclear how to generalize those to 3D axial and helical CT efficiently.

III.5 SF Compared with DD

The DD method essentially approximates the voxel footprints using rectangles in both directions on a common plane such as xz or yz plane. It also uses the separable and shift-invariant detector blur (21) on the detector plane. However, the approximated separable detector blurs on the common plane based on the mapped boundaries of original detector blurs are no longer shift invariant. This appears to prevent using the inner loop over $s_k$ that aids efficiency of the SF methods.

IV RESULTS

To evaluate our proposed SF-TR and ST-TT projectors, we compared them with the DD projector, a current start-of-the-art method. We compared their accuracy and speed as single modules and within iterative reconstruction methods.

IV.1 Forward and Back-Projector as Single Modules

We simulated an axial cone-beam flat-detector X-ray CT system with a detector size of $N_s \times N_t = 512 \times 512$ cells spaced by $\Delta_S = \Delta_T = 1$ mm with $N_\beta = 984$ angles over 360°. The source to detector distance $D_{sd}$ is 949 mm, and the source to rotation center distance $D_{s0}$ is 541 mm. We included a rectangular detector response (21) with $r_s = \Delta_S$ and $r_t = \Delta_T$.

We implemented the SF-TR and SF-TT projector in an ANSI C routine. The DD projector was provided by De Man et al., also implemented as ANSI C too. All used single precision. For both the SF methods and the DD method we used POSIX threads to parallelize the operations. For the forward projector each thread works on different projection views, whereas for the back projector each thread works on different image rows ($n_2$).

IV.1.1 Maximum Errors of Forward Projectors

We define the maximum error as $$e(\beta; \vec{n}) = \max_{s,t \in \mathbb{R}} |F(s, t; \beta; \vec{n}) - F_{ap}(s, t; \beta; \vec{n})|, \quad (46)$$

where $F_{ap}$ is any of the approximate blurred footprints by the SF-TR, SF-TT and DD methods. We generated the true blurred footprint $F(s, t; \beta; \vec{n})$ in (19) by linearly averaging 1000×1000 analytical line integrals of rays sampled over each detector cell. We computed the line integral of each ray by the exact method described in (23).

Figure 3A:
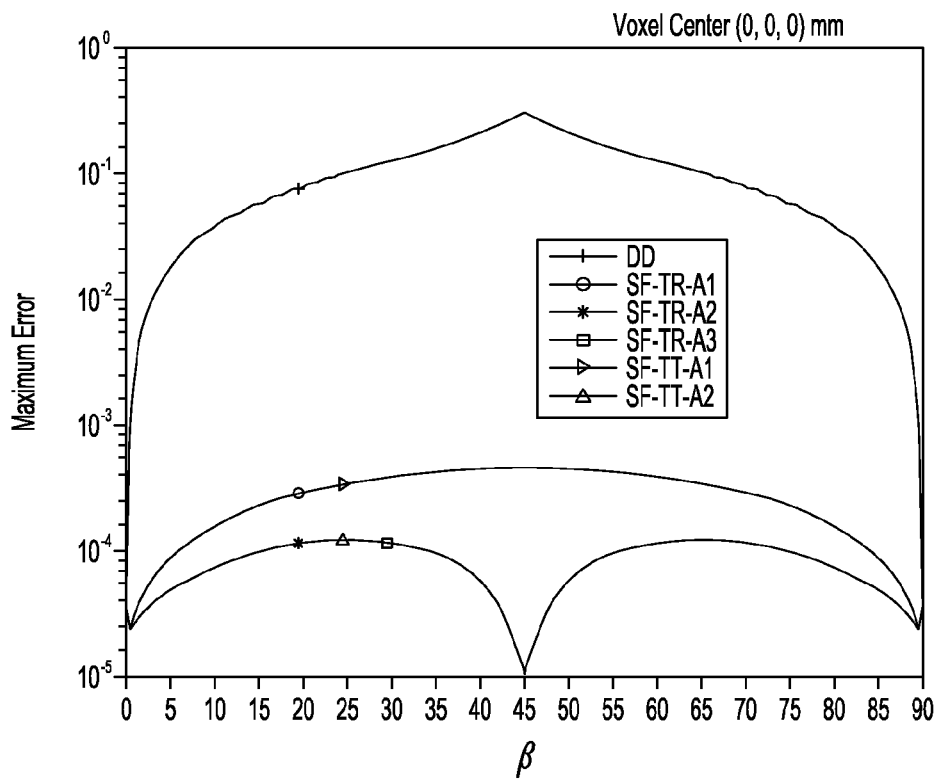
FIGS. 3A-3B are a series of illustrations showing the maximum error comparison between the forward DD, SF-TR, and SF-TT projectors for a voxel centered at the origin (FIG. 3A) and a voxel centered at (100, 150, −100) right (FIG. 3B)
Figure 3B:
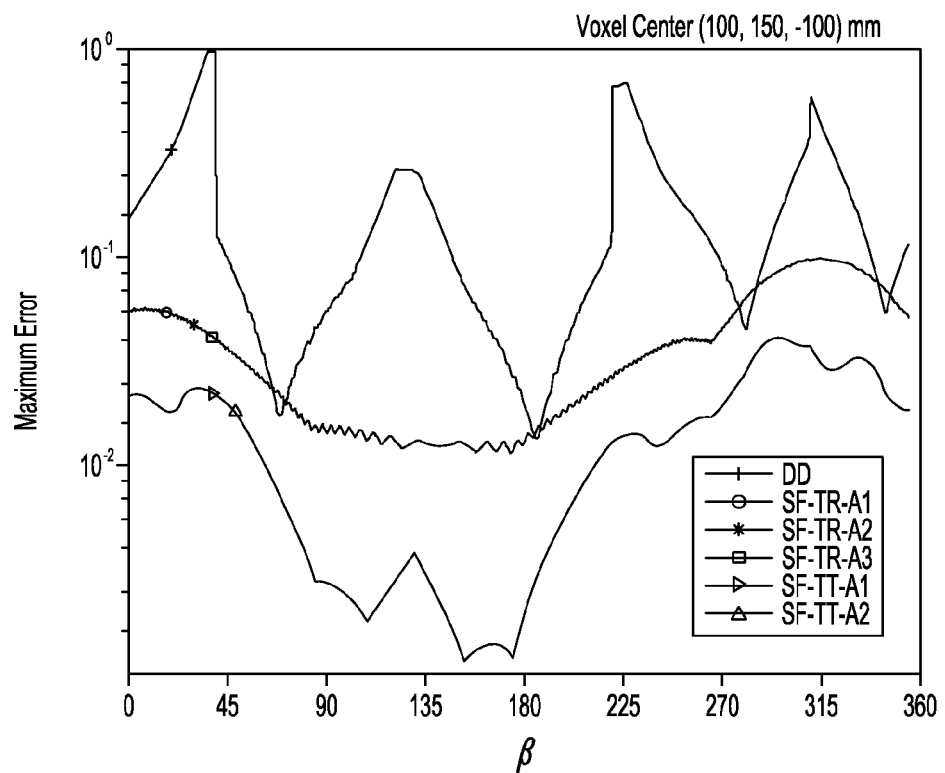

We compared the maximum errors of these forward projectors for a voxel with $\Delta_1 = \Delta_2 = \Delta_3 = 1$ mm centered at the origin. Since the voxel is centered at the origins of all axes, we choose $N_\beta = 180$ angles over only 90° rotation. FIG. 3 shows the errors on a logarithmic scale. We compared the proposed three amplitude methods by combining them with the SF-TR projector. The errors of the A1 method are slightly larger than those of the A2 method; the biggest difference, at $\beta = 45°$, is only $3.4 \times 10^{-4}$. The error curves of the A2 and A3 methods overlap with each other. For the SF-TT projector, we plotted only the A1 and A2 methods because the combination of the SF-TT projector and A3 method is computationally much slower but only slightly improves accuracy. For the same amplitude method, the error curves of the SF-TR and SF-TT method overlap. The reason is that the rectangular and trapezoid approximation are very similar for a voxel centered at the origin of z axis. All the SF methods have smaller errors than the DD method, i.e., the maximum error of the DD projector is about 652 times larger than the proposed SF methods with the A1 amplitude, and $2.6 \times 10^3$ times larger than the SF methods with the A2 amplitude when $\beta = 45°$.

TABLE 2

Speed comparison of DD, SF-TR and SF-TT forward and back projectors.

| Projectors | DD | SF-TR-A1 | SF-TR-A2 | SF-TR-A3 | SF-TT-A1 | SF-TT-A2 |
|---|---|---|---|---|---|---|
| Forward time | 46 | 35 | 35 | 59 | 91 | 91 |
| Backward time | 49 | 44 | 45 | 63 | 92 | 93 |

The units are seconds.

FIG. 3 also compares the maximum errors of these forward projectors for a voxel centered at (100, 150, −100) mm. We choose $N_\beta = 720$ angles over 360° rotation. The error curves of the SF-TR projector with three amplitude methods overlap and the curves of the SF-TT projector with the A1 and A2 amplitude methods overlap with each other, demonstrating again that these three amplitude methods have similar accuracies. For voxels associated with large cone angles, the SF-TT projector is more accurate than the SF-TR projector. The maximum errors of the DD and SF-TR projector are about 13 and 3 times of that of the SF-TT projector respectively.

IV.1.2 Speed of Forward and Back-Projectors

We compared computation times of the DD, SF-TR and SF-TT forward and backward projectors using an image with a size of $N_1 = 512$, $N_2 = 512$, $N_3 = 128$ and a spacing of $\Delta_1 = \Delta_2 = \Delta_3 = 0.5$ mm in the x, y, z direction respectively. We evaluated the elapsed time using the average of 5 projector runs on a 8-core Sun Fire X2270 server with 2.66 GHz Xeon X5500 processors. Because of the "hyperthreading" of these Nehalem cores, we used 16 POSIX threads. (We found that using 16 threads reduced computation time by only about 10% compared to using 8 threads.)

Table 2 summarizes the computation times. For the SF-TR projector, the A1 and A2 amplitude methods have similar speed, but the A3 method is about 50% slower. The computation times of the SF-TR and DD projector are about the same, whereas the SF-TT projector is about 2 times slower. Although execution times depend on code implementation, we expect SF-TR and DD to have fairly similar compute times because the inner loop over z involves similar simple arithmetic operations for both methods.

IV.2 Forward and Back-projectors within Iterative ROI Reconstruction

We compared the DD and SF projectors (SF-TR and SF-TT) with the A1 and A2 amplitude methods within iterative image reconstructions. The results of A1 and A2 methods were visually the same. For simplicity, we present the results of SF projectors with the A1 method.

IV.2.1 SF-TR vs. DD

In many cases, the region of interest (ROI) needed for diagnosis is much smaller than the scanner field of view (FOV). ROI reconstruction can save computation time and memory. Ziegler et al. (b) proposed the following approach for iterative reconstruction of a ROI.

1. Iterative reconstruction of the whole FOV, yielding an initial estimate $\hat{x}_{FOV}$ of $\hat{x}_{FOV}$ which is the vector of basis coefficients of the object $f(\vec{x})$, i.e., $f[\vec{n}]$ in (14).
2. Define $\hat{x}_{FOV}^m = \hat{x}_{FOV} \cdot m$ where $m = (m_1, \ldots, m_p)$ with $0 \le m_j \le 1$ (j=1, ..., p) is a mask vector setting the estimated object, inside the ROI to zero and providing a smooth transition from the ROI to the remaining voxels.
3. Compute $p_{out} = A \hat{x}_{FOV}^m$ which is the forward projection of the masked object $\hat{x}_{FOV}^m$.
4. Compute the projection of ROI, $p_{roi} = y - p_{out}$ where y is the measured data.
5. Iterative reconstruction of the ROI only from $p_{roi}$. Due to the transition zone, the region of this reconstruction needs to be extended slightly from the predetermined ROI.

This method requires accurate forward and back projectors. Errors in step 2, where re-projection of the masked image is computed, can greatly affect the results of subsequent iterative ROI reconstruction. Moreover, for general iterative image reconstruction, even small approximation errors might accumulate after many iterations. We evaluated the accuracy of our proposed SF-TR projector and the DD projector in this iterative ROI reconstruction method.

We simulated the geometry of a GE LightSpeed X-ray CT system with an arc detector of 888 detector channels for 64 slices ($N_s = 888$, $N_t = 64$) by $N_\beta = 984$ views over 360°. The size of each detector cell was $\Delta_S \times \Delta_T = 1.0239 \times 1.0964$ mm². The source to detector distance was $D_{sd} = 949.075$ mm, and the source to rotation center distance was $D_{s0} = 541$ mm. We included a quarter detector offset in the s direction to reduce aliasing.

We used a modified 3D Shepp-Logan digital phantom that has ellipsoids centered at the z=0 plane to evaluate the projectors. The brain-size field of view (FOV) was 250×250×40 mm³, sampled into 256×256×64 voxels with a coarse resolution of 0.9766×0.9766×0.6250 mm³.

We simulated noiseless cone-beam projection measurements from the Shepp-Logan phantom by linearly averaging 8×8 analytical rays sampled across each detector cell. Noiseless data is used because we want to focus on projector accuracy. We scaled the line integrals by a chosen factor to set their maximum value to about 5.

Figure 4A:
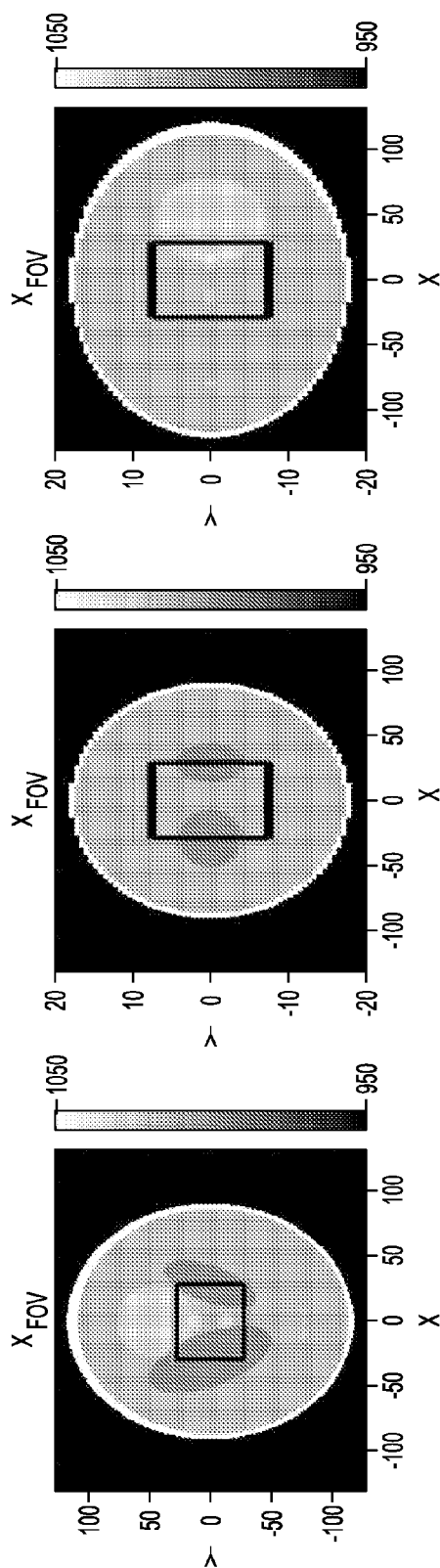
FIGS. 4A-4B are a series of illustrations of Shepp-Logan digital phantoms in Hounsfield units, wherein the left series illustrates an axial view, the center series illustrates a coronal view, and the right series illustrates a sagittal view.
Figure 4B:
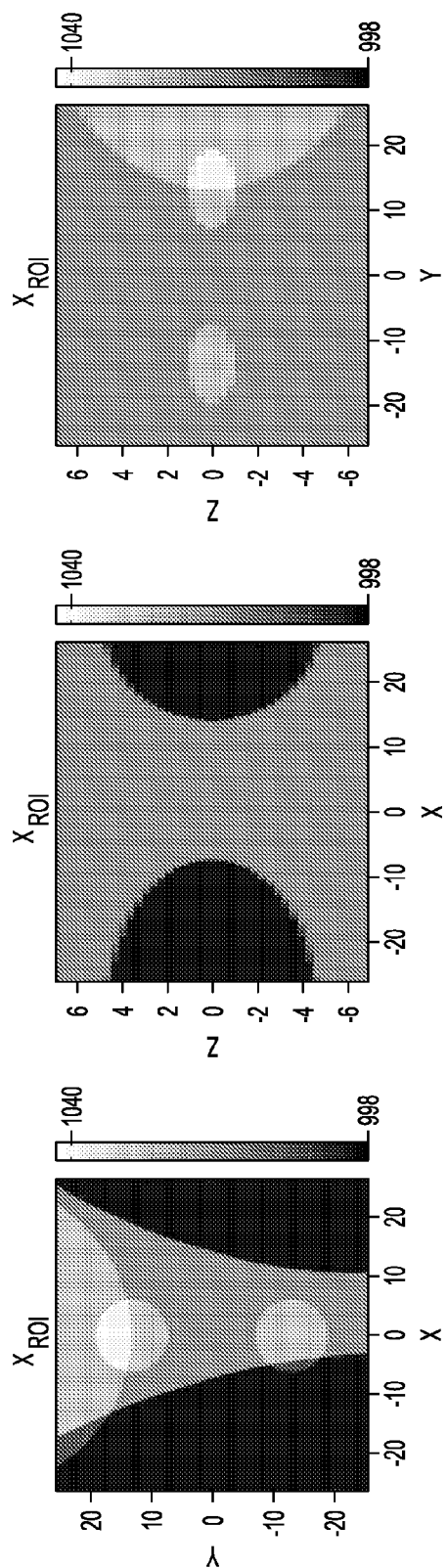

We chose a ROI centered at the rotation center that covered about 48.8×48.8×12.5 mm³ (50×50×20 voxels with the coarse resolution). The transition zone surrounds the ROI, and covers about 13.7×13.7×5 mm³ (14×14×8 voxels with the coarse resolution). To construct masked images $\hat{x}_{FOV}^m$, we removed the ROI and smoothly weighted the voxels corresponding to the transition zone by a 3D separable Gaussian function. FIG. 4 shows different views of $x_{FOV}$ with the transition zone superimposed on it in the first row.

We implemented iterative image reconstruction of the entire FOV with these two projector/backprojector methods. We ran 300 iterations of the conjugate gradient algorithm, initialized with reconstruction by the FDK method, for the following penalized weighted least-squares cost function with an edge-preserving penalty function (PWLS-CG):

$$\Phi(x_{FOV}) = \sum_i w_i \frac{1}{2}(y_i - [Ax_{FOV}]_i)^2 + \beta R(x_{FOV}) \quad (47)$$

$$R(x_{FOV}) = \sum_k \psi([Cx_{FOV}]_k), \quad (48)$$

where $y_i$ is the negative log of the measured cone-beam projection, $w_i$ values are statistical weighting factors, A is the system matrix, C is a differencing matrix and $\psi(t)$ is the potential function. We used the hyperbola:

$$\psi(t) = \frac{\delta^2}{3}\left(\sqrt{1 + 3\left(\frac{t}{\delta}\right)^2} - 1\right). \quad (49)$$

For this simulation, we used $w_i = \exp(-y_i)$, $\beta=4$ and $\delta=5$ Hounsfield units (HU).

FIG. 5 shows axial views of the reconstructed images $\hat{x}_{FOV}^{SF-TR}$ and $\hat{x}_{FOV}^{DD}$ by the iterative method (PWLS-CG) using the SF-TR and DD method respectively. We computed the maximum error, $\max_j |\hat{x}_j - x_j|$, and root-mean-square (RMS) error, $$\sqrt{\frac{1}{N}\sum_{j=1}^{N}(\hat{x}_j - x_j)}.$$

The maximum and RMS errors of $\hat{x}_{FOV}^{SF-TR}$ and $\hat{x}_{FOV}^{DD}$ are close because the errors are dominated by the axial cone-beam artifacts due to the poor sampling (not truncation) at the off-axis slices, but the DD method causes artifacts that are obvious around the top and bottom areas. This figure illustrates that the SF method improves image quality for full FOV reconstruction with large basis functions (coarse resolution).

We applied the PWLS-CG iterative method mentioned above with $\beta=1$ and $\delta=1$ HU to reconstruct estimated ROI images $\hat{x}_{FOV}^{SF-TR}$ and $\hat{x}_{ROI}^{DD}$ of 256×256×64 voxels with a fine resolution of 0.2441×0.2441×0.3125 mm³. The domains of $\hat{x}_{ROI}^{SF-TR}$ and $\hat{x}_{ROI}^{DD}$ covered the ROI and transition zone (see FIG. 4). For this image geometry, we also generated a Shepp-Logan reference image $x_{ROI}$ from the same ellipsoid parameters used to generate $x_{FOV}$. FIG. 4 shows different views of $x_{ROI}$ in the second row. The fine sampling of $x_{ROI}$ is ¼ and ½ of the coarse sampling of $x_{FOV}$ in the transaxial and axial direction respectively, and has a size of 200×200×40.

FIG. 6 shows the axial view of reconstructed images $\hat{x}_{ROI}^{SF-TR}$ and $\hat{x}_{ROI}^{DD}$ by the iterative method (PWLS-CG) using the SF-TR and DD projector. The maximum errors are 20 HU and 105 HU for the SF and DD method respectively and the RMS errors are 1.6 HU and 2.8 HU. The SF-TR projector provides lower artifact levels than the DD projector. The rectangle approximation in the transaxial direction of the DD method resulted in larger errors in the reprojection step and caused more errors when resolution changed from coarse to fine. The rectangle approximation basically blurs corners of image voxels, and the level of blur varies for different image voxel sizes.

We also reconstructed full FOV images (not shown) at a fine resolution, i.e., 1024×1024×128 voxels with a spacing of 0.2441×0.2442×0.3125 mm³. There were no apparent artifacts in both reconstructed images using the SF-TR and DD method and the maximum and RMS errors were similar. It seems that the aliasing artifacts in the reconstruction by the DD method were removed by fine sampling. For smaller transaxial voxel sizes, the difference between the rectangular (DD method) and trapezoid (SF-TR) approximation becomes less visible.

IV.2.2 SF-TR Vs. SF-TT

We compared the SF-TR and SF-TT projectors by reconstructing an image under an axial cone-beam CT system with largest cone angle of 15° or so using these two methods. We expected to see differences in some off-axis slices of the reconstructed images because the trapezoid approximation of the SF-TT method is more realistic than the rectangle approximation of the SF-TR method especially for voxels far away from the origin. Nevertheless, we did not see obvious visual difference, and the maximum and RMS errors were similar. It appears that the axial cone-beam artifacts due to poor sampling (not truncation) at the off-axis slices dominate other effects in the reconstructed images, such as the errors caused by rectangle approximation. Further research will evaluate these two projectors within iterative reconstruction methods under other CT geometries where the off-axis sampling is better, such as helical scans, yet where the cone angle is large enough to differentiate the SF-TR and SF-TT method.

V CONCLUSION

We presented two new 3D forward and back projector for X-ray CT: SF-TR and SF-TT. Simulation results have shown that the SF-TR projector is more accurate with similar computation speed than the DD projector, and the SF-TT projector is more accurate but computationally slower than the SF-TR projector. The DD projector is particularly favorable relative to other previously published projectors in terms of the balance between speed and accuracy. The SF-TR method uses trapezoid functions in the transaxial direction and rectangular functions in the axial direction, while the SF-TT method uses trapezoid functions in both directions. The rectangular approximation in the axial direction is adequate for CT systems with small cone angles, such as the multi-slice geometries. The trapezoid approximation is more realistic for geometries with large cone angles, such as the flat-panel detector geometries. To balance accuracy and computation, we recommend to combine the SF-TR and SF-TT method, which is to use the SF-TR projector for voxels corresponding to small cone angles and to use the SF-TT projector for voxels corresponding to larger cone angles.

The model and simulations here considered an ideal point source. For a finite sized X-ray source there would be more blur and it is possible that the differences between the SF and DD methods would be smaller.

Approximating the footprint functions as 2D separable functions is the key innovation of this approach. Since the separability greatly simplifies the calculation of integrals of the footprint functions, using more accurate functions in the transaxial and axial direction is possible without complicating significantly the calculations.

The computational efficiency of the SF methods rely on the assumption that the vertical (t) axis of the detector plane is parallel to the rotation axis. If the detector plane is slightly rotated then slight interpolation would be needed to resample onto coordinates that are parallel to the rotation axis.

Although we focused on voxel basis functions in this disclosure, the idea of 2D separable footprint approximation could also be applied to other basis functions with separability in the axial and transaxial directions, with appropriate choices of functions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A processor-implemented method for forward and back projection for image construction, the method comprising:
    computing projected coordinates of a plurality of 3D voxels on a detector surface;
    approximating 2D footprints of said plurality of voxels as separable functions, said separable functions being a computational product of a 1D axial footprint function and a 1D transaxial footprint function;
    approximating 2D detector blur as a computational product of a 1D axial blur function and a 1D transaxial blur function; and
    determining the contribution of said plurality of voxels to detector cells or vice versa using computational sums and products of said 1D axial footprint function, said 1D transaxial footprint function, said 1D axial blur function, and said 1D transaxial blur function in accordance with said projected coordinates.

2. The method according to claim 1,
    wherein said 1D transaxial footprint function comprises trapezoidal functions and said 1D axial footprint function comprises rectangular functions.

3. The method according to claim 1
    wherein said 1D transaxial footprint function and said 1D axial footprint function each comprises trapezoidal functions.

4. The method according to claim 1
    wherein said 1D transaxial footprint function and said 1D axial footprint function each comprises a combination of trapezoidal functions and rectangular functions.

5. The method according to claim 1, further comprising:
    determining vertices of said 1D axial footprint function and said 1D transaxial footprint function using said projected coordinates of said plurality of 3D voxels.

6. The method according to claim 1 wherein parameters of the step of computing projected coordinates of said plurality of voxels comprises connecting a source and computing said projected coordinates in response to said boundaries of said plurality of voxels and said detector surface.

7. The method according to claim 1 wherein parameters of the step of determining the contribution of said plurality of voxels to detector cells or vice versa comprises:
    computing 2D blurred footprints of said plurality of 3D voxels as computational products of 1D axial blurred footprints and 1D transaxial blurred footprints, said 1D axial blurred footprints being 1D convolutions of said 1D axial footprint functions and said 1D axial blur functions, said 1D transaxial blurred footprints being 1D convolutions of said 1D transaxial footprint functions and said 1D transaxial blur functions.

8. The method according to claim 1 wherein said determining the contribution of said plurality of voxels to said detector cells or vice versa comprises at least one of a forward projection and a back projection operation followed or preceded by detector-cell-dependent amplitude scaling factors.

9. The method according to claim 1 wherein the determining the contribution of said plurality of voxels to said detector cells or vice versa comprises at least one of a forward projection and a back projection operation followed or preceded by voxel-dependent scaling factors.

10. The method according to claim 1 wherein the determining the contribution of said plurality of voxels to said detector cells or vice versa comprises at least one of a forward projection and a back projection operation followed or preceded by a combination of detector-cell-dependent and voxel-dependent scaling factors.

11. A projector or back-projector system having a non-transitory computer readable medium encoded with an executable program for image reconstruction, said projector or back-projector system comprising:
    a computational system using computational operations occurring separately in axial and transaxial directions that exploit the separability of approximation of a footprint function, said computational operations comprising:
    computing projected coordinates of a plurality of 3D voxels on a detector surface;
    approximating 2D footprints of said plurality of voxels as separable functions, said separable functions being a computational product of a 1D axial footprint function and a 1D transaxial footprint function;
    approximating 2D detector blur as a computational product of a 1D axial blur function and a 1D transaxial blur function; and
    determining the contribution of said plurality of voxels to detector cells or vice versa using computational sums and products of said 1D axial footprint function, said 1D transaxial footprint function, said 1D axial blur function, and said 1D transaxial blur function in accordance with said projected coordinates.

12. The system according to claim 11 wherein said computational operations occur separately and in parallel in axial and transaxial directions.

13. The system according to claim 11 wherein said 1D transaxial footprint function comprises trapezoidal functions and said 1D axial footprint function comprises rectangular functions.

14. The system according to claim 11 wherein said 1D transaxial footprint function and said 1D axial footprint function each comprises trapezoidal functions.

15. The system according to claim 11 wherein said 1D transaxial footprint function and said 1D axial footprint function each comprises rectangular functions.

16. The system according to claim 11 wherein said 1D transaxial footprint function and said 1D axial footprint function each comprises a combination of trapezoidal functions and rectangular functions.

17. The method according to claim 1 wherein said 1D transaxial footprint function and said 1D axial footprint function each comprises rectangular functions.

18. The method according to claim 1 wherein said 1D axial blur function and said 1D transaxial blur function each comprises rectangular functions.

* * * * *